US010600119B2

(12) United States Patent
Barnett et al.

(10) Patent No.: US 10,600,119 B2
(45) Date of Patent: Mar. 24, 2020

(54) SYSTEMS AND METHODS FOR CONTEXT-BASED EVENT TRIGGERED PRODUCT AND/OR SERVICE OFFERINGS (71) Applicant: The Toronto-Dominion Bank, Toronto (CA)

(72) Inventors: Jonathan K. Barnett, Toronto (CA); Paul Mon-Wah Chan, Toronto (CA); Roisin Lara Fritz, Toronto (CA); John Jong Suk Lee, Toronto (CA); Michael Grouios, Toronto (CA); Joe Moghaizel, I, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 607 days.

(21) Appl. No.: 15/285,573

(22) Filed: Oct. 5, 2016

(65) Prior Publication Data
US 2017/0124626 A1 May 4, 2017

Related U.S. Application Data (60) Provisional application No. 62/248,881, filed on Oct. 30, 2015, provisional application No. 62/248,900, filed on Oct. 30, 2015.

(51) Int. Cl.
*G06Q 30/00* (2012.01)
*G06F 17/30* (2006.01)
(Continued)

(52) U.S. Cl.
CPC ........ *G06Q 40/02* (2013.01); *G06Q 30/0269* (2013.01); *G06Q 30/0631* (2013.01)

(58) Field of Classification Search
CPC ..................................................... G06Q 40/02
See application file for complete search history.

(56) References Cited

U.S. PATENT DOCUMENTS 10,108,714 B2 * 10/2018 Cavalin ................ G06F 16/951
2013/0159132 A1 * 6/2013 Adams ................... G06Q 50/01
705/26.7

(Continued)

OTHER PUBLICATIONS

Paul, J. (2016). Aegon pledges guidance service will not be advice. Financial Adviser, Retrieved from https://search.proquest.com/docview/1765940393?accountid=14753.*

*Primary Examiner* — Kathleen Palavecino
(74) *Attorney, Agent, or Firm* — Duane Morris LLP (57) ABSTRACT The disclosed embodiments include methods and systems for providing context-based event determination and/or context-based event triggered product and/or service offerings. A system may automatically detect that a client has experienced, directly or indirectly, a personal event, (e.g. a birth, a wedding engagement, a death, a car accident) and use such context to trigger the offering of a product and/or service. Product and/or service data is maintained for respective products and/or services available to clients as is events data associating respective products and/or services to particular personal event scenarios. An offering of at least one product and/or service to provide the client may be determined following the receipt of a personal event scenario experienced by the client. Operations may be performed to communicate to another computer system across a network to provide to the client the offering of the at least one product and/or service.

22 Claims, 5 Drawing Sheets

(51) Int. Cl.
*G06Q 40/02* (2012.01)
*G06Q 30/02* (2012.01)
*G06Q 30/06* (2012.01)

(56) References Cited

U.S. PATENT DOCUMENTS

| | | | |
|---|---|---|---|
| 2014/0201294 A2* | 7/2014 | Eden | G06Q 10/10 709/206 |
| 2014/0377727 A1* | 12/2014 | Yom-Tov | G06F 16/951 434/236 |
| 2017/0068962 A1* | 3/2017 | Panchamgam | G06Q 30/01 |

* cited by examiner

SYSTEMS AND METHODS FOR CONTEXT-BASED EVENT TRIGGERED PRODUCT AND/OR SERVICE OFFERINGS

CROSS-REFERENCE TO RELATED APPLICATIONS

This application claims the benefit under 35 U.S.C. § 119(e) of U.S. Provisional Application Ser. No. 62/248,881 filed Oct. 20, 2015 /255,236, the content of which is incorporated by reference herein in its entirety. This application further claims the benefit under 35 U.S.C. § 119(e) of U.S. Provisional Application Ser. No. 62/248,900 filed Oct. 20, 2015 /255,236, the content of which is incorporated by reference herein in its entirety.

TECHNICAL FIELD

The disclosed embodiments generally relate to systems, methods, and apparatuses for context-based event detection and determination, and for example, and without limitation, to systems and methods for providing context-based event triggered product and/or service offerings based on monitored sensor data obtained from network devices.

BACKGROUND

Many people are living pay cheque to pay cheque. Being able to meet financial obligations in both times of anticipated and unanticipated events, where additional financing may be required, becomes an extra burden and stress. This stress may be compounded by the stress and anxiety and other activities of dealing with the unexpected event itself. Without immediate access to an emergency fund, such as savings, liquid investments, a line-of-credit or other financing, most people struggle with the steps involved in coming up with the money needed to get through this transitional time. Even if financing is ultimately obtained, applicants still have to go through the steps of shopping, applying and qualifying for it. And whether they are living pay cheque to pay cheque or not, the notion of taking on debt can be stressful. Someone might wonder: how much money will I need to support me through this; how will I get the money; how will I pay it back and where do I start? Having a way to anticipate people's cash flow needs and to offer them a solution that eliminates these questions before they may be even considered, is a valuable offering in today's busy world. This is true in times of unanticipated events, where events happen outside of someone's control, as well as anticipated events, where one's preference is to focus on other details. Being able to provide cash, when its needed most, might simply be a way to delight and surprise a person, and increase customer loyalty.

SUMMARY

The disclosed embodiments include systems and methods to provide context-based event detection and determination and context-based event triggered product and/or service offerings. As used herein, "A and/or B" is an "inclusive or" expression and means "one of A or B or both A and B". For example, "a product and/or service" means "a product or a service or both a product and a service."

A system or method may automatically detect that a client has experienced, directly or indirectly, a personal event, (e.g. a birth, a wedding engagement, a death, a car accident) and use such context to trigger the offering of a product and/or service. Product and/or service data is maintained for respective products and/or services available to clients as is events data associating respective products and/or services to particular personal event scenarios. An offering of at least one product and/or service to provide the client may be determined following the receipt of a personal event scenario experienced by the client. Operations may be performed to communicate to another computer system across a network to provide to the client the offering of the at least one product and/or service.

There is disclosed, a system, comprising: a storage device; and at least one processor coupled to the storage device, the storage device storing software instructions for controlling the at least one processor when executed by the at least one processor. The at least one processor is operative with the software instructions and configured to: maintain product and/or service data for respective products and/or services available to clients; maintain events data associating respective products and/or services to particular personal event scenarios; receive a personal event scenario experienced by a client; determine an offering of at least one product and/or service to provide the client in accordance with: the personal event scenario; and any products and/or services associated by the events data; and perform operations to communicate to another computer system across a network to provide to the client the offering of at least one product and/or service.

The at least one processor may be further configured to evaluate the events data to determine whether any action is indicated for the personal event scenario. The at least one processor may be further configured to: maintain client data for a client; determine anticipated needs to address the action indicated; and determine, using the client data, whether the client can meet the anticipated needs. Communicating to the other computer system to provide the offering may be performed if the client cannot meet the anticipated needs. A product and/or service may comprise a financial product and/or financial service. An action may comprise a financial action. Client data may comprise client financial data. Anticipated needs may comprise anticipated financial needs.

The client financial data may comprise, for the client: credit rating data; income data, whether from employment and/or business sources; asset related data comprising bank account, investment, real and personal property data; insurance data; and loan or other liability related data.

To provide to the client the offering may comprise electronically communicating with a client device across a communications network in accordance with client preference information for the client.

The at least one processor may be further configured to communicate to another computer system to provide to the client an offering of at least one non-financial product or service associated with the personal event scenario by the events data.

To maintain the events data may comprise training a predictive component of the system to associate the product and/or service to particular personal event scenarios using real-world data examples of personal event scenarios, the real-world data examples compiled by the system by examining client inquiries for particular products, the examining by the system performed following the receiving of a personal event scenario experienced by the client.

The events data may further associate a receptivity indicator with the personal event scenario and the at least one product and/or service. The receptivity indicator indicates how receptive the client is likely to be to the offering after experiencing the personal event scenario. The at least one processor may be further configured to: associate the receptivity indicator to the client; and provide to the client the offering in response to the receptivity indicator.

The receptivity indicator may be used to determine a time-period within which to or not to communicate the offering to the client after experiencing the personal event scenario.

The at least one processor may be further configured to: populate a client list comprising clients to receive a same particular offering. The populating and/or ordering of the client list may be responsive to respective receptivity indicators associated with the respective clients.

The at least one processor may be further configured to perform operations to provide the product and/or service to the client, including updating the client data. The at least one processor may be further configured to: collect information about the client's experiencing of the personal event scenario; and perform operations to communicate such information to a further computer system configured to detect and communicate when clients experience personal event scenarios.

There is disclosed a computer implemented method comprising: maintaining, by at least one processor, product and/or service data for respective products and/or services available to clients; maintaining, by at least one processor, events data associating respective products and/or services to particular personal event scenarios; receiving a personal event scenario experienced by a client; determining, by at least one processor, an offering of at least one product and/or service to provide the client in accordance with: the personal event scenario; and any products and/or services associated by the events data; and performing, by at least one processor, operations to communicate to another computer system across a network to provide to the client the offering of at least one product and/or service.

The disclosed embodiments further include a storage device and at least one processor coupled to the storage device. The storage device may store software instructions for controlling the at least one processor when executed by the at least one processor, for example, to perform the method or methods as herein described.

Additional objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

As the H. W. Longfellow maxim says, "Into each life some rain must fall". Events, whether unfortunate, tragic, joyous, fortuitous, anticipated, or unanticipated, often entail financial obligations or have financial implications for those associated with the event. A person experiencing a significant event often experiences associated changes to the person's personal baseline, particularly upon or shortly after the initial occurrence of the event—a personal spike may be occasioned. Physiological and other data related to a person may be monitored to establish a baseline and spikes detected to assist with the determination of the occurrence of a significant personal event.

Analyzing associated contextual data may determine the nature of the personal event and the person's relationship to it. For example, was the personal event a car accident where the person was driver? Was the personal event a wedding engagement where the person was expected to carry a significant burden of paying for the wedding? These and many other personal event scenarios may be modeled and programmed to assist with the analysis and determination. Financial obligations or other financial impacts may be associated to respective scenarios as may be non-financial obligations or impacts. Actions such as the offering of specific products and/or services or withdrawal of products and/or services may be associated. Receptivity indicators may also be associated to respective scenarios (e.g. by the events data), for example, providing an indication of whether or when to make or withhold from making offerings of products. Feedback and other learning techniques may be employed to refine the detection of personal events, the determination of applicable personal event scenarios and relations, associated obligations, impacts and actions as well as receptivity indicators to offerings, etc.

The average couple takes 14 months to plan their wedding and spends roughly $30,000 in wedding costs. During this time, those paying for the ultimate event, whether the couple or parents/family, etc., have to make many financial commitments, which could be a source of stress and disagreement. Being able to identify the need and provide for the additional cash flow could assist.

A car accident may significantly influence a person's automobile insurance rates and the person's monthly living expenses. A person may decide to fix damages outside of an insurance policy to mitigate the increase in on-going payments or where coverage is lacking, necessitating access to immediate cash.

These examples are some of the many applications where the disclosed embodiments may be implemented. Other aspects, features, and functionalities of the disclosed embodiments are described below.

Figure 1:
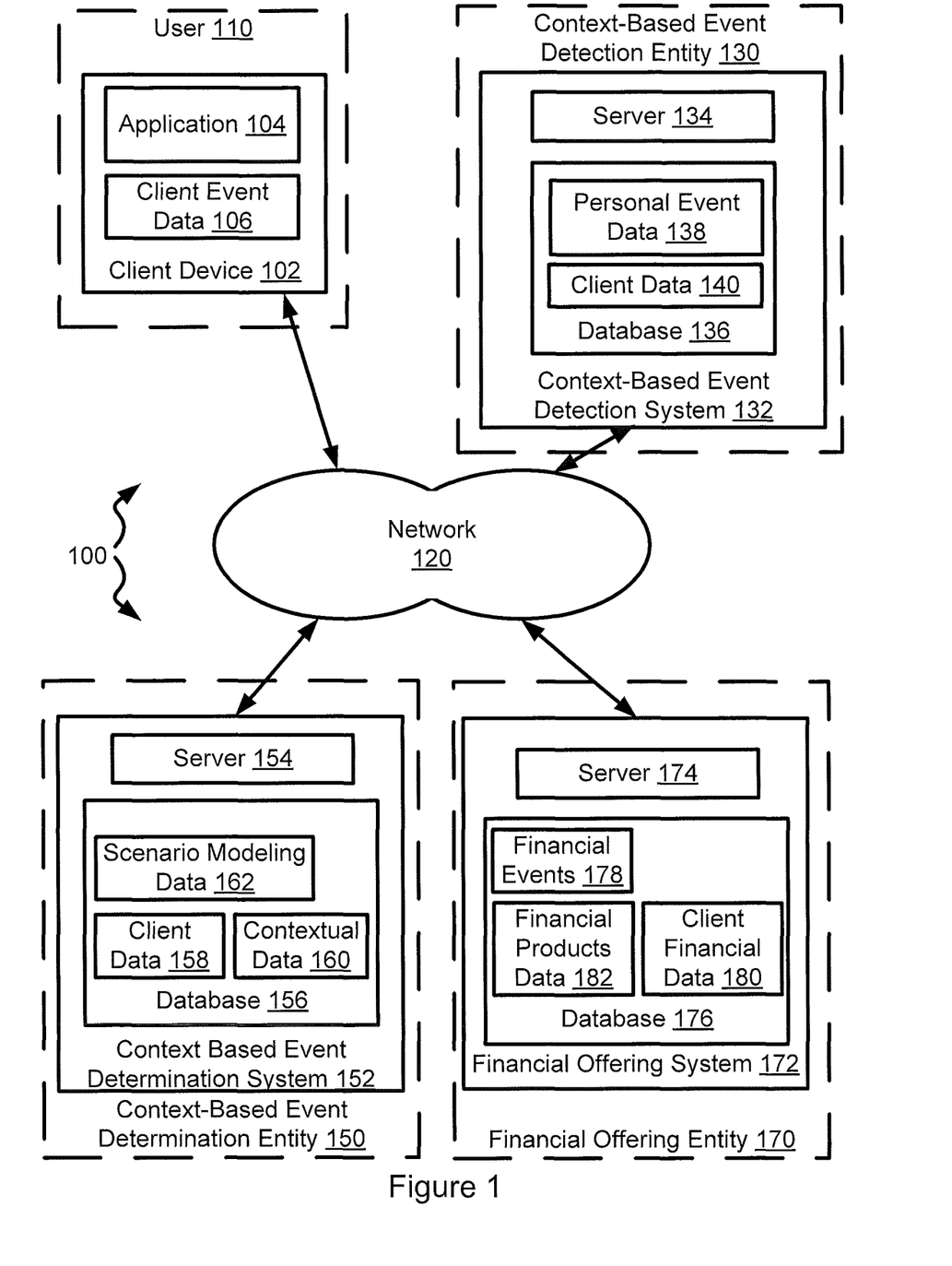
FIG. 1 depicts an exemplary computing environment consistent with disclosed embodiments.

FIG. 1 depicts an exemplary computing environment 100 consistent with the disclosed embodiments. In one aspect, computing environment 100 may include one or more context-based event detection systems (e.g., 132), which may be associated with one or more context-based event detection entities (e.g., 130). In additional aspects, environment 100 may include one or more client devices (e.g., 102), which may be associated with respective one or more users (e.g., 110). Environment 100 may also include one or more context-based event determination systems (e.g., 152), which may be associated with one or more context-based event determination entities (e.g., 150). In further aspects, environment 100 may include one or more financial offering systems (e.g., 172), which may be associated with one or more financial offering entities (e.g. 170). Though described as financial offering systems and entities, such may be non-financial offering systems and entities or configured to provide both financial and non-financial offerings. Environment 100 may include both financial offering systems as shown and non-financial offering systems as not shown.

In some embodiments, environment 100 may include communication network 120. In some aspects, communication network 120 may represent any type of network or medium of digital communication for transmitting information between computing devices. For example, communication network 120 may include a LAN, a wireless LAN, a cellular network, a GSM network, a satellite network, an RF network, a Near Field Communication (NFC) network (e.g., a WiFi network), a wireless Metropolitan Area Network (MAN) connecting multiple wireless LANs, NFC communication link(s), any physical wired connection (e.g., via an I/O port), and a WAN (e.g., the Internet). In some embodiments, communication network 120 may be secured through physical encryption (e.g., line encryption), by requiring information to be encrypted on other computer systems (e.g., end encryption), and the like.

In certain aspects, communication network 120 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. In some aspects, communication network 120 may also include one or more mobile device networks, such as a GSM network or a PCS network, allowing devices (e.g., client device 112, a triggering device, etc.) to send and receive data via applicable communications protocols, including those described herein.

In certain aspects, context-based event detection system 132 of environment 100 may be configured to process, store, receive, obtain, and transmit information. In certain aspects, such systems may be configured to execute software instructions to perform one or more processes consistent with the disclosed embodiments. In some embodiments, context-based event detection entity 130 may include any entity storing, using, managing, or processing information related to providing context-based detection for a user or other entity. For example, in some aspects, a context-based event detection entity may include a business entity providing such detection as a service.

In certain aspects, context-based event detection system 132 may include one or more servers (e.g., server 134), and one or more data storages (e.g., database 136). In some embodiments, server 134 may include software programs and one or more processors for executing the programs. Server 134 may be configured to execute software instructions to perform one or more processes consistent with the disclosed embodiments. In one embodiment, for example, a user device (e.g., 102) and/or another computing system may exchange information facilitating execution of the one or more processes consistent with the disclosed embodiments. The software instructions of server 134 may be incorporated into a single computer, a single server, or any additional or alternative computing device apparent to one of ordinary skill in the art. Server 134 may also include distributed computing devices and computing systems, and may execute software instructions on separate computing systems and servers. Context-based event detection system 132 may include one or more data repositories (e.g. database 136) configured to store information consistent with the disclosed embodiments (e.g., information related to, obtained from, and/or sent to client devices or context-based event determination system 152, user preferences received over communication network 120, etc.). The information may comprise personal event data 138 and client data 140, for example. Client data 140 may comprise information identifying a particular user and/or associated client devices of the particular user from which personal event data 138 is received. Personal event data 138 may comprise the personal event data received and/or processed by system 132 associated with the user via the client data, for example. For each user, the personal event data may define a personal baseline with which to compare to new instances of personal event data, for example, to identify a personal spike or instance of such data that may represent a significant personal event. As described below, personal event data 138 may include instances of contextual data 142.

In some aspects, context-based event detection system 132 may include a computer having one or more processors selectively activated or reconfigured by a computer program. Such a computer may be configured as a particular computing system based on execution of software instructions that perform one or more processes consistent with the disclosed embodiments. In certain aspects, context-based event detection system 132 may be incorporated as corresponding nodes in a distributed network, and/or as corresponding networked servers in a cloud-computing environment. In one embodiment, context-based event detection system 132 may communicate with one or more additional servers that facilitate the distribution of processes for parallel execution by the additional servers.

In some embodiments, environment 100 may include one or more client devices (e.g., client device 102) and/or other scenario data collecting devices (not shown). In certain embodiments, a client device and/or personal data collection device may include any computing, data transmitting, data receiving, or data processing device consistent with the disclosed embodiments. In some aspects, a personal data collecting device may include a client device; however, a client device may not be a personal data collecting device.

In certain aspects, a client device or personal data collection device may include any device capable of providing and receiving information over a communication network (e.g., communication network 120). For example, a client device or personal data collection device may include a personal computer, a laptop computer, a tablet computer, a notebook computer, a hand-held computer, a personal digital assistant, a portable navigation device, a mobile phone, a wearable device (e.g., a smart watch), an embedded device, a smartphone, an RFID device, a pager, and any additional or alternate device capable of receiving or providing information to communications network 120 (e.g., a computer system 200 of FIG. 2).

Additionally or alternatively, client and personal data collection devices consistent with the disclosed embodiments may include a positioning device or sensor (e.g., global positioning system (GPS) unit, an RFID unit, etc.) capable of obtaining positioning data indicative of a current geographic position of the corresponding client and/or scenario data collection device. In certain aspects, the client and/or personal data collection devices may process the received positional data and transmit portions of the received positioning data to system 132. This transmitted data may be transmitted in association with personal event data collected by such devices, for example, at regular or predetermined intervals, in response to requests received from system 130 or otherwise (e.g. when personal event data collected exceeds a certain threshold as determined by the device).

As described below, context-based event detection system 132 may process the received positional data to monitor current geographic positions of the client and/or personal data collection devices to gather contextual data (e.g. 142) with which to determine the context associated with the personal spike and to determine a personal event scenario associated with the personal spike. Other contextual data may be collected by client and/or personal data collection devices and transmitted to context-based event detection system 132. Contextual data 142 may include user data such as a user's contact data, calendar data, messaging or other communication related data, time, date, location, among many other context data. Other contextual data is discussed further below in relation to context-based event determination entity 150 as contextual data 160.

Figure 2:
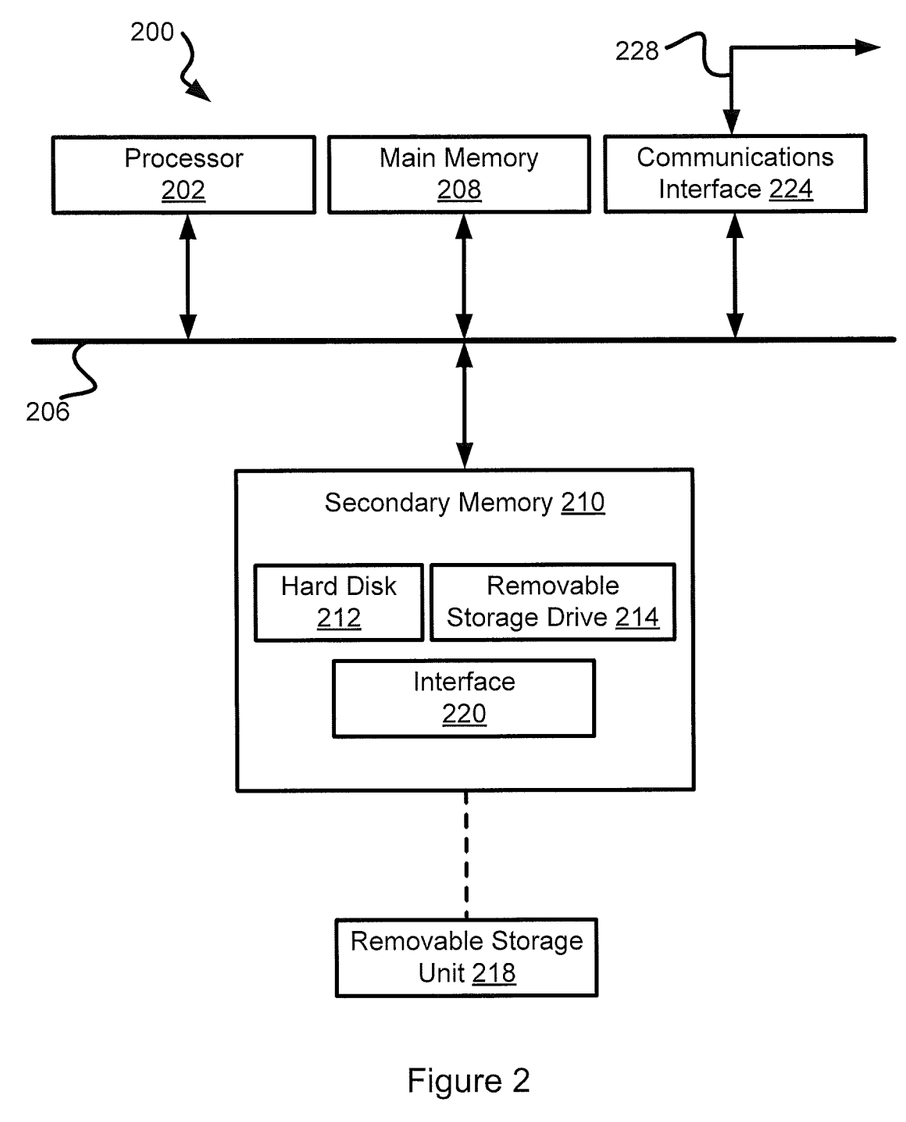
FIG. 2 depicts an exemplary computing system consistent with the disclosed embodiments.

Additionally or alternatively, client and personal data collection devices consistent with the disclosed embodiments may include one or more I/O interfaces and I/O devices and or be coupled via communication interface 224 with such I/O devices. I/O devices for receiving client input include but are not limited to a keyboard, touch screen, camera, microphone, biometric or other sensors such a heart rate monitors, EEG/EKG monitors, vital sign sensors, heat detectors, etc. Client device 102 may receive input actively such as when a user is intentionally using an I/O device to operate the client device 102 or passively such as via a biometric sensor monitoring a biometric function of the user in a background manner. Client device 102 may be configured to receive input and process such input to generate instances of personal event data. Such personal event data may be relative to separate specific input types (e.g. individual voice, keyboard or sensor input types) or may be processed as a measure of a combination of one or more such inputs (e.g. audio (e.g. voice) and visual data from a microphone and camera or audio and biometric sensor in combination, etc.).

Personal event data, gathered from instances over time, may be useful to define a personal baseline for the user such as may be generated and maintained by context-based event detection system 132. Respective instances of personal event data may be associated with a time of occurrence. Respective instances of personal event data (e.g. client event data 106) may be communicated to context-based event detection system 132 such as periodically at regular or irregular intervals. Instances of personal event data (including contextual data) may be aggregated by client device 102, stored as client event data 106 and communicated in a batch or other aggregation.

Models of such data (e.g. personal event data and contextual data) may be defined for a specific user to define a personal baseline. A personal baseline (e.g. a model) for the user may take many forms. Various machine learning and/or prediction techniques may be employed in components of the system such as structured prediction, probabilistic graphic models, Markov models including Hidden Markov Models (HMM), Bayesian networks, random fields, Neural Nets, Support Vector Machines (SVM), etc. The personal baseline model may be used to identify personal spikes where instances of the personal event data deviate from the personal baseline. Contextual data may also be evaluated when determining the occurrence of a personal spike. Deviation may exceed a threshold may be determined when one or more instances of personal event data exceed a threshold. By way of one example, instances of heart rate data maybe collected as well as instances of calendar data showing a user's physical workout schedule. Such personal event data and contextual data may be provided to the model to define the personal baseline. Future instances of personal event data, including time of occurrence and/or location data, may be evaluated using the model. Should a high heart rate be detected during a physical work out or at a location of such a workout, as modeled by the baseline, such personal event data may be ignored as not representing a personal spike. A high or abnormally low heart rate at a different location, such as on a highway, may indicate a personal spike. The spike may indicate a personal event scenario such as a car accident.

Client device 102 may apply a threshold to instances of personal event data to determine when to communicate such data. For example, context-based event detection system 132 may determine a personal baseline and one or more thresholds. The thresholds may be communicated to client device 102. Such thresholds may be used to evaluate and trigger communication of instances of personal event data to system 132.

In some embodiments, a client device may be associated with one or more users (e.g., user 110). In one example, a user may use client device to perform one or more processes consistent with the disclosed embodiments. For example, user 110 may use client device 102 to input information and to exchange information with other systems in environment 100, such as system 172 or another computing system (not shown) in connection with communications network 120.

In certain aspects, context-based event determination system 152 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, context-based event determination system 152 may be associated with one or more context-based event determination entities (e.g., entity 150). In some embodiments, context-based event determination entity 150 may include any entity storing, using, managing, or processing information related to providing context-based event determination for a user or other entity (e.g., any of the entities described in connection with context-based event detection entity 130, financial offering entity 170, a separate business entity, a human user, etc.). For example, in some aspects, a context-based event determination entity may include a business entity providing such determination as a service. In some embodiments, context-based event determination entity may be related to, concomitant with, or associated with context-based event detection entity 140 or financial offering entity 170, although such relationship is not required.

In some aspects, context-based event determination system 152 may include a computer having one or more processors selectively activated or reconfigured by a computer program. Such a computer may be configured as a particular computing system based on execution of software instructions that perform one or more processes consistent with the disclosed embodiments. In certain aspects, personal event determination system 152 may be incorporated as corresponding nodes in a distributed network, and/or as corresponding networked servers in a cloud-computing environment. In one embodiment, context-based event determination system 152 may communicate with one or more additional servers that facilitate the distribution of processes for parallel execution by the additional servers.

As noted, in certain aspects, context-based event determination system 152 may include one or more servers (e.g., server 154), and one or more data storages (e.g., database 156). In some embodiments, server 154 may include software programs and one or more processors for executing the programs. Server 154 may be configured to execute software instructions to perform one or more processes consistent with the disclosed embodiments. In one embodiment, for example, a context-based event determination system (e.g., 152) and/or another computing system may exchange information facilitating execution of the one or more processes consistent with the disclosed embodiments. The software instructions of server 154 may be incorporated into a single computer, a single server, or any additional or alternative computing device apparent to one of ordinary skill in the art. Server 154 may also include distributed computing devices and computing systems, and may execute software instructions on separate computing systems and servers. The one or more data repositories (e.g. database 156) may be configured to store information consistent with the disclosed embodiments (e.g., information related to, obtained from, and/or sent to user device 102, context-based event detection system 132, financial offering system 172, user preferences received over communication network 120, etc.). The information may comprise client data 158, contextual data 160, and scenario modeling data 162, for example. Client data 158 may comprise information identifying a particular user and/or associated client devices of the particular user from which personal data for particular personal events is generated. Such data may also identify friends and/or family of the particular user and respective client devices thereof from which respective personal data is collected.

Contextual data 160 may comprise information associated with the personal spike. Such information may include but is not limited to any one or more of:
emotion characterization data (e.g. client data collection devices/systems may be calibrated to determine a level of anxiety and whether such anxiety represents a positive or negative client response—e.g. a strong positive emotion can be correlated with overwhelming joy. Calibration may include a learning process to determine personal states, for example, using a large training set);
personal spike time of occurrence data;
user browsing history data;
user calendar data;
user messaging data (e.g. email, text, voice, social media data related to communications sent or received by the user);
user positional data, location based services data, traffic/infrastructure data, utility service data (e.g. 911 dispatch data), Internet of Things (IoT) data. IoT data typically provides very targeted contextual data which is specific to individual items/things such as: vehicle telemetry data when connected to a vehicle, home/office or other location data such as fire detection when connected to a sensor/alarm, etc.;
proximity social trend/feed data such as social media data originated by friends/family or other person sharing a proximity relationship to the user (e.g. co-worker, person sharing an experience such as a co-traveler on a tour etc.). Such data may be generated before or following a detected personal spike; and
associated transactional data such as specific financial transactions made in correlation to a personal event. Transactional information can be collected to understand the correlation between events and specific transactional behaviours. As an example, every time a specific person goes through a relationship break up, he or she goes to a casino and spends an excessive amount of money. Such a correlation may assist to anticipate a cash flow need, in advance to the casino event, the next time this person goes through a break up. Similarly, by way of another example, a person may have achieved a major goal they have been working towards (e.g. achieved a professional designation or promotion, closed a major transaction, finished a fitness or sporting goal, etc.) and thereafter spends a large sum of money on a big ticket purchase as a reward (e.g. electronics, restaurant, clothes, etc.).

Contextual data may also include general information, whether or not related specifically to user 110 or the user's friends and family such as news, weather, sports, business, arts/entertainment information. Contextual data 160 may be received from user device 102, other user devices (not shown), context-based event detection system 132, and/or other systems (not shown), which may be operated or provided by third party entities (not shown).

Contextual data 160 may be obtained and maintained by context-based event determination system 152 periodically or triggered upon the occurrence of a personal spike. Specific instances of contextual data 160 may be related to one another such as by time of occurrence and/or relationship to client device 102 and/or user 110 or friends and family thereof, among other relationships. Time windowing, such as by defining various time spans, may be used to relate various contextual data. For example, a data set of contextual data may be defined for use to determine a personal event scenario by selecting contextual data for the user that is within time spans before and/or after the time of occurrence of a personal spike. Contextual data may be related using more than one personal spike for the user and/or connected circle of friends and family.

Scenario modeling data 162 includes data that models various personal event scenarios and, using at least the contextual data and may include using personal event data and/or client data, is useful to determine one or more likely personal event scenarios associated to the personal spike that is consistent with the contextual data. Personal event scenarios may include but are not limited to: an accident, a loss of job, a loss of a family member, a damage to a home, an expectation of a new child, an engagement/wedding announcement, an acceptance to college, a purchase or move to a new home, a new business opportunity, etc. Scenarios may also include further particularity and/or a relationship of the user/client to the event. For example, an accident may be particularized as a car accident. The relationship may be that the user was directly involved in the car accident, was a witness to the car accident or is a friend or family member of another involved in a car accident. Operations of the systems and methods performed thereby may be configured with scenario modeling data and to examine the detected data to locate scenarios that are personal to the user and/or friend or family and which are likely to affect the user's and/or friend's or family's financial situation such that an offer of a financial product might assist. The model may have other scenarios (e.g. where offers of a financial product to the user are not indicated) to assist to disambiguate among candidate scenarios when a spike or spikes are examined.

As described further below, some personal scenarios may be associated with potential financial obligations and impacts and associated financial actions such as offerings of financial products/services (or withdrawals of financial products/services) that may assist with the scenario. Some scenarios may be associated with other non-financial offerings of assistance and still others with no offerings. Receptivity indicators may also be associated to the scenarios. For example the indication may relate to a specific financial offering, suggesting a timing when to make or delay making an offer or not making such an offer. The occurrence of a personal event and an associated receptivity indicator may be useful to configure a variety of communications between a financial institution and its clients. Such data may be useful to call centre operators, call list compilers such as when populating client lists, mailing campaign (whether electronic or otherwise) list compilers, etc. Receptivity may be useful to populate a client list or order a client list such as to bump a person up, down or off such lists.

As described further below, receptivity indicators may be developed through a learning mechanism, for example, analyzing response rates to offers made after certain personal events are detected, and feed back into a financial event model. Alternatively or in addition, surveys/questionnaires may be conducted in regard to client service following such offers to elicit feedback about appropriateness, etc. Receptivity may be measured or gauged in an aggregate basis across multiple customers/offer recipients and/or on an individual customer/recipient basis. A receptivity measure may indicate how receptive an individual is likely to be to certain types of offers/messages, which may be associated to a time of offer after the commencement of the personal scenario (detection of the personal spike).

Scenario modeling data 162 and processes to determine likely personal event scenarios may take many forms. Various machine learning and/or prediction techniques may be employed in components of the system such as structured prediction, probabilistic graphic models, Markov models including Hidden Markov Models (HMM), Bayesian networks, random fields, Neural Nets, Support Vector Machines (SVM), etc. Preferably, such scenario modeling data 162 and processes when executed with contextual data associated with one or more personal spikes may provide an indication of a likelihood that a candidate scenario is a correct one, (e.g. using a confidence interval), which may be useful to select among the candidates.

Personal modeling data may be defined by training a machine learning data model with example contextual data thereby to define various aspects of the model for use when processing actual contextual data associated with a real user's personal spike. Such personal modeling data may be refined and maintained to hone the quality and other aspects of the model, for example, to achieve more accurate output.

In accordance with an embodiment, processing to determine a personal event scenario may be undertaken one or more times for a particular personal spike. For example, using the time windowing approach mentioned above, more and/or different contextual data may be selected and applied to or processed by the scenario modeling data to output candidate personal event scenarios. For example, examining the contextual data 160 within 2 hours of an occurrence of a personal spike may output a candidate event scenario with a 45% confidence interval. Examining the contextual data 160 within 48 hours of an occurrence of a personal spike, where more or different contextual data is available, may output the candidate event scenario with an 80% confidence interval. Similarly, time windowing may be used to look back, to data collected before the time of occurrence of the personal spike, using different time intervals to produce candidate personal event scenarios and associated confidence intervals.

Examining the contextual data 160 may output one or more candidate personal event scenarios with associated representation of likelihood or confidence that the model is accurately determining the personal event. A threshold may be established and used to select among such candidates.

As noted above, the candidate scenarios may include a relationship factor relating the user and the personal event determined by system 152. For example, relationship may be that the user is directly involved or is involved indirectly such as through a friend or family member. The determination may identify the friend or family member who directly experienced a personal event. Such information identifying the friend or family member may be used to trigger an offering of a financial product to the friend or family member and/or to the user on behalf of the friend or family member. Such information identifying the friend or family member may be useful as contextual information, etc. when processing a personal spike or spikes and contextual information of the friend or family member.

In certain aspects, financial offering system 172 of environment 100 may be configured to process, store, receive, obtain, and transmit information over communications network 120 for use in processes consistent with the disclosed embodiments. In certain aspects, such systems may be configured to execute software instructions to perform one or more processes consistent with the disclosed embodiments. In some aspects, financial offering system 172 may be associated with one or more financial offering entities (e.g., entity 170). In some embodiments, financial offering entity 150 may include any entity storing, using, managing, or processing information related to providing financial offerings, such as a financial institution, for a user or other entity (e.g., any of the entities described in connection with context-based event detection entity 130, context-based event determination entity 150, a separate business entity, a human user, etc.). For example, in some aspects, a financial offering entity may include a business entity providing such financial offering as a service. In some embodiments, financial offering entity may be related to, concomitant with, or associated with context-based event detection entity 140 or context-based event determination entity 150, although such relationship is not required.

In some aspects, financial offering system 172 may include a computer having one or more processors selectively activated or reconfigured by a computer program. Such a computer may be configured as a particular computing system based on execution of software instructions that perform one or more processes consistent with the disclosed embodiments. In certain aspects, financial offering system 172 may be incorporated as corresponding nodes in a distributed network, and/or as corresponding networked servers in a cloud-computing environment. In one embodiment, financial offering system 172 may communicate with one or more additional servers that facilitate the distribution of processes for parallel execution by the additional servers.

As noted, in certain aspects, financial offering system 172 may include one or more servers (e.g., server 174), and one or more data storages (e.g., database 156). In some embodiments, server 174 may include software programs and one or more processors for executing the programs. Server 174 may be configured to execute software instructions to perform one or more processes consistent with the disclosed embodiments. In one embodiment, for example, financial offering system 172 and/or another computing system may exchange information facilitating execution of the one or more processes consistent with the disclosed embodiments. The software instructions of server 174 may be incorporated into a single computer, a single server, or any additional or alternative computing device apparent to one of ordinary skill in the art. Server 174 may also include distributed computing devices and computing systems, and may execute software instructions on separate computing systems and servers. The one or more data repositories (e.g. database 176) may be configured to store information consistent with the disclosed embodiments (e.g., information related to, obtained from, and/or sent to user device 102, context-based event detection system 132, context-based event determination system 152, user preferences received over communication network 120, etc.). The information may comprise events data (e.g. financial events data 178), client data (e.g. client financial data 180), and products and/or services data (e.g. financial products data 182), for example. Unless the context indicates otherwise, financial products herein includes financial services. Financial events data 178 may include financial offering data associated with particular personal event scenarios. Financial events data 178 may comprise mapping data to associate a personal event scenario to one or more particular financial products of financial products data 182. Generally then, events data may comprise mapping data to associate a personal event scenario to one or more products and/or services of products and/or services data which may be maintained. The financial offering data may identify specific financial products to be offered, the data defining such financial products stored as financial products data 182. Data and/or instructions to determine anticipated needs (e.g. anticipated financial needs) associated with the respective personal event scenario may be included.

Financial products data 182 may include rules or other information (e.g. various "know your client" rules, among others) concerning how to offer and obtain client information to conclude an offering for a specific financial product (e.g. a car loan, mortgage, line of credit, etc.). Offers may be made such as by communication to a client device, whether by telephonic means or data transmission means (e.g. email, SMS (text), etc.) or by other media such as print, etc. delivered to a client or made orally such as in a meeting between a client and advisor. It will be understood that, in some aspects, an offer may include an advertisement or offer that is informational in nature and that, in other aspects, an offer may be a formal or contractual offer, the acceptance of which makes a binding contract.

By way of example, in one aspect, an offer may be defined to be delivered telephonically, in a campaign, such as via a call center calling client devices of clients utilizing client lists of a particular financial institution. The offer may be informational in nature, for example, advising that fees for a particular financial product are reduced or waived for new clients/applications initiated in the next period of weeks. Events data such as financial events data 178 may comprise mapping data to associate a personal event scenario to such an informational offering even though such an offering may not be designed or indicated to address a need arising from such a personal event scenario. The association between the personal event scenario and the offering may indicate that the offering should not be made to the particular client experiencing the personal event scenario, for example, because it may be perceived as insensitive or otherwise because receptivity is likely to be low. The call list may be modified to remove or not include the particular client. Conversely, the mapping may indicate that such an offering is more likely to be received in a favourable manner and as such the call list may be compiled (populated) to include the particular client and/or reordered to have such a client called early and/or more frequently in the campaign.

Products and or services data may include data and/or instructions on how a client may qualify for a specific product (e.g. a financial product), for example, setting out tests or thresholds to measure against a particular client's client data including client financial data. In some aspects, financial offering system 172 may further maintain data and/or instructions to actually process or provide such financial products to clients such as data, processes/work flow, etc. However, it will be appreciated that other financial or non-financial systems, not shown, may perform operations to provide such financial products or non-financial products and/or services to a client.

Client financial data 180 may include the personal event scenario determined by system 152. Client financial data 180 may include specific client financial information for particular users, such as user 110. Client financial data 180 may include but not be limited to credit rating data, income data (whether from employment or business sources, etc.), asset data such as bank account data, investment data and other asset related data (e.g. cars, home or other real property, personal property, etc. including value and liquidity information), insurance data (e.g. property, health, life insurance) and loan or other liability related data (e.g. mortgages, business loans, personal or other lines of credit, credit cards, etc.) Client financial data 180 may comprise information identifying a particular user and/or associated client devices of the particular user from which personal data for particular personal events is generated and/or to which financial offerings of financial products may be communicated. Client financial data 170 may be examined to determine whether a particular client has the ability to address any financial need arising from the determined personal event scenario and/or whether the client may qualify for a particular financial product that may be offered upon the determination of the personal event scenario. For loan offerings for example, financial institutions typically examine a client's credit rating, income, assets and liabilities and determines debt to debt service ratios. Other qualifying criteria may be used.

In certain embodiments, the various systems (e.g. 132, 152, 172) may receive authorization from another computing system (e.g., a computing system associated with the user or any of the entities, etc.) before the respective systems are authorized or permitted to collect personal data, determine a personal event and make a financial offering triggered by such personal event.

While FIG. 1 depicts environment 100 with a certain number of client devices (e.g., client device 102), context-based event detection systems (e.g., 132), communication networks (e.g., 120), context-based event determination systems (e.g., 152), and financial offering systems (e.g., 172), environment 100 may contain any number of such systems consistent with the disclosed embodiments. For example, environment 100 may include a plurality of client devices and such systems. Environment 100 may also include additional communication networks, and other networks not shown in FIG. 1 consistent with the disclosed embodiments.

FIG. 2 depicts a block diagram of exemplary computer system 200 with which certain aspects consistent with the disclosed embodiments may be implemented. For example, in some aspects, computer system 200 may reflect computer systems associated with a client device (e.g., client device 102), system 132, and the like. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, communication network 120, and any associated protocols such as HTTP, TCP/IP, RFID, etc.).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc., enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In other embodiments, secondary memory 210 may include other means for allowing computer programs or other program instructions to be loaded into d computer system 200. Such means may include, for example, another removable storage unit 218 or an interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, and/or other communications channels. In one embodiment, the signals comprise data packets sent to processor 202. Information representing processed packets may also be sent in the form of signals from processor 202 through communications path 228.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

Not shown in FIG. 2 are I/O interfaces or I/O devices, which may be coupled to computer system 200. I/O devices may include keyboards, microphones, speakers, pointing devices, display screens, with our without touch input capabilities, biometric and other sensors to monitor user functions, position sensors (e.g. for general location, such as a GPS, and/or for relative position/orientation of the device locally such as using accelerometers and/or gyroscopes), etc.

The disclosed embodiments include systems, methods, and computer-readable mediums for storing instructions that, when executed by a processor(s), perform operations for offering financial products to a user. The offerings are triggered on the occurrence of specific personal events. In some aspects, the disclosed embodiments may monitor one or more devices relevant to the user and detect a personal "spike": an occurrence of personal event data that exceeds a threshold for the user, for example, when compared with the user's personal baseline. In certain aspects, the disclosed embodiments may determine, using contextual data, personal event scenarios associated with the personal spike, and provide a financial offering of a financial product to the user to assist with the personal event.

Figure 3:
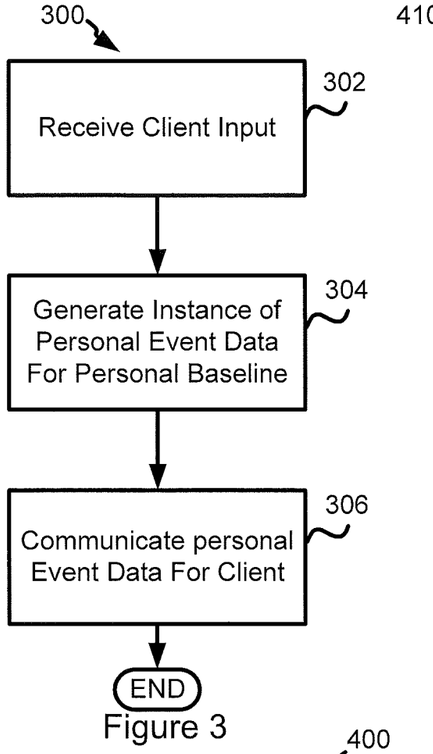
FIG. 3 depicts a flowchart for an exemplary personal event sensing process consistent with the disclosed embodiments.

For example, FIG. 3 depicts a flowchart for an exemplary personal data collection process 300 consistent with the disclosed embodiments. In some aspects, client device 102 system 142 is configured to receive client input, whether actively or passively generated by user 110 (step 302). At step 304, an instance of personal event data is generated from the input, such as for determining or maintaining a personal baseline. Alternatively or in addition such instance may be generated to determine a personal spike. At step 306, personal event data is communicated to context-based event detection system 132. As noted above, in some embodiments, a threshold may be applied to determine when (i.e. trigger) such communication. Receipt of the thresholds is not shown.

Figure 4A:
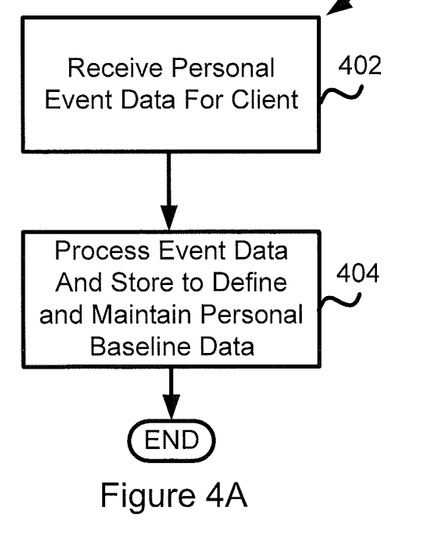
FIGS. 4A-4B depict flowchart for an exemplary-context-based event detection process consistent with the disclosed embodiments.
Figure 4B:
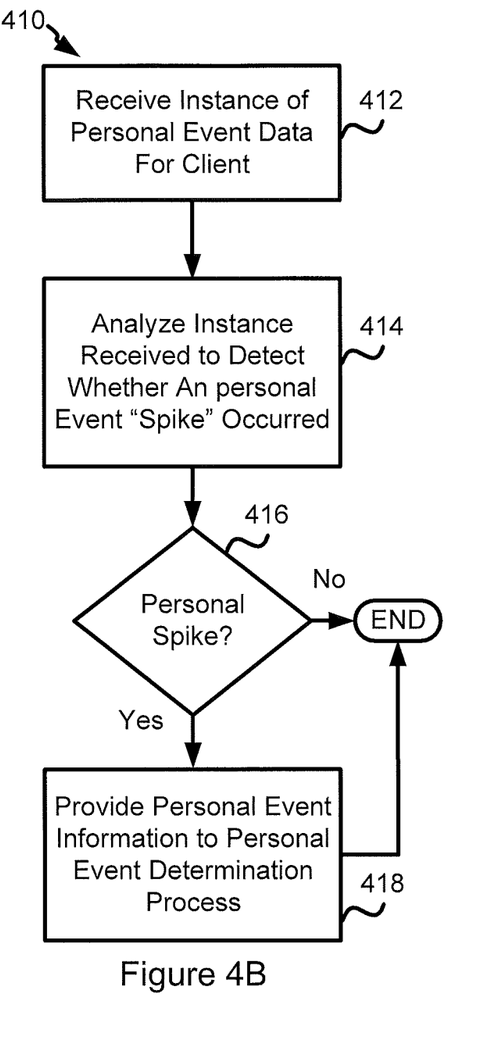

FIGS. 4A and 4B depict flowcharts for exemplary context-based event detection processes 400 and 410 consistent with the disclosed embodiments. In some aspects, context-based event detection system 132 receives an instance of personal event data from client device 102 (step 402). Such personal event data is associated with a user 110 and is processed and stored (step 404) to define and maintain a personal baseline for the user 110. Such baseline data may be useful to compare to respective instances of personal event data to identify personal spikes, generally characterized and instances falling outside or beyond regular parameters of the personal data, which spikes may be indicative of the occurrence of a personal event. The personal baseline may be configured using machine learning or other techniques to define a model, machine or other prediction component whereby a new instance of personal event data may be processed to determine whether such instance is a personal spike or otherwise within "normal" parameters of the personal baseline. Tracking of personal event data may be performed by tracking one or more types of input data, for example, multiple types of biometric data (e.g. heart rate, sweat, etc.) Individual or combined baselines may be established for each input and thresholds (e.g. based on X deviations from baseline) similarly established to identify personal spikes. The output of such model, machine or other prediction component may have an associated confidence interval.

In some aspects, context-based event detection system 132 receives an instance of personal event data from client device 102 (step 412). The particular instance of personal event data is analyzed at step 414 (e.g. processed by a model, machine or other prediction component of the personal baseline as described) to detect whether a personal spike has occurred. If a spike is not detected, processing stops via "No" branch from step 416. If a spike is detected, via "Yes" branch from step 416 processing continues. At step 418, context-based event detection system 132 may provide personal event information to a personal event determination process such as at context-based event determination system 152.

Though context-based event detection system 132 is depicted as a separate component of environment 100, features and functions of context-based event detection system 132 may be provided by client device 102 and such context-based event detection system 132 may be eliminated.

Figure 5:
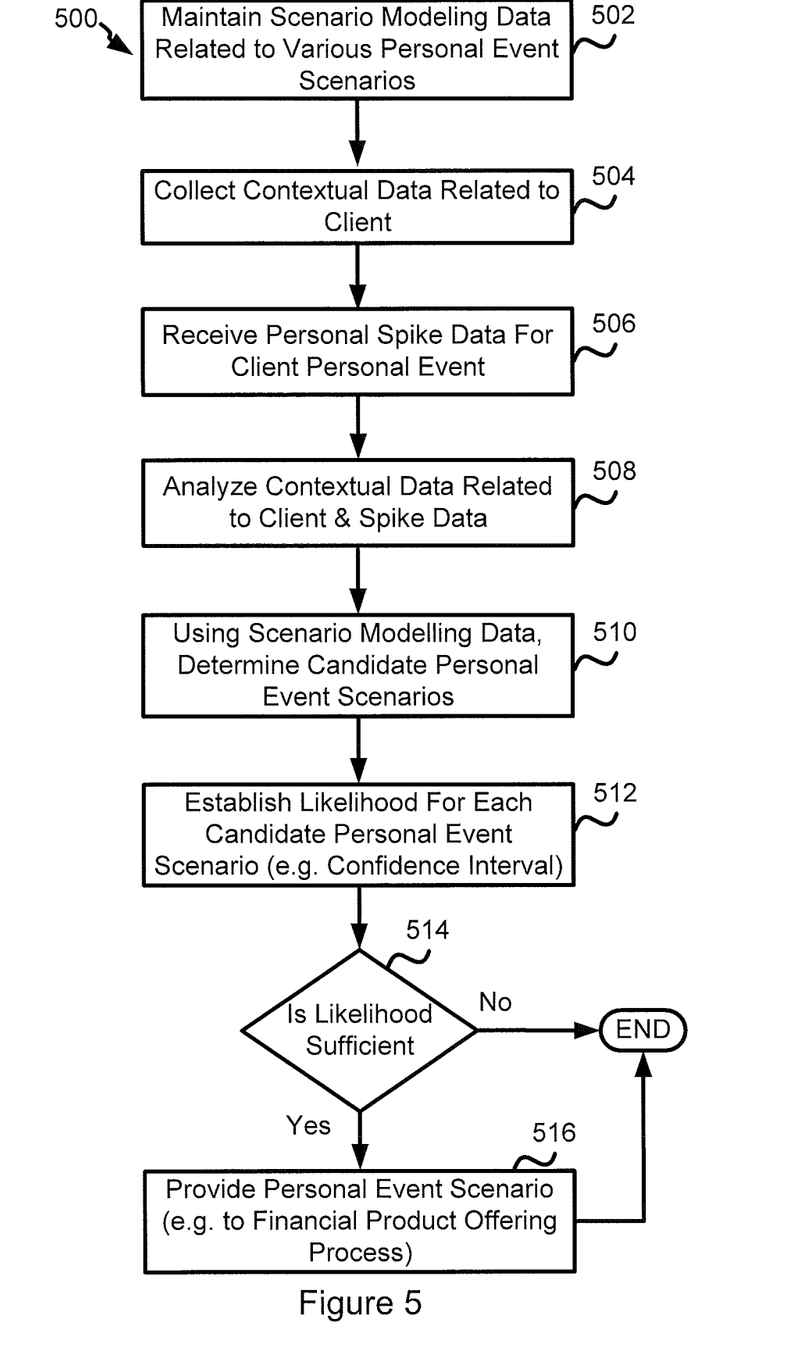
FIG. 5 depicts a flowchart for an exemplary context-based event determination process consistent with the disclosed embodiments.
Figure 6:
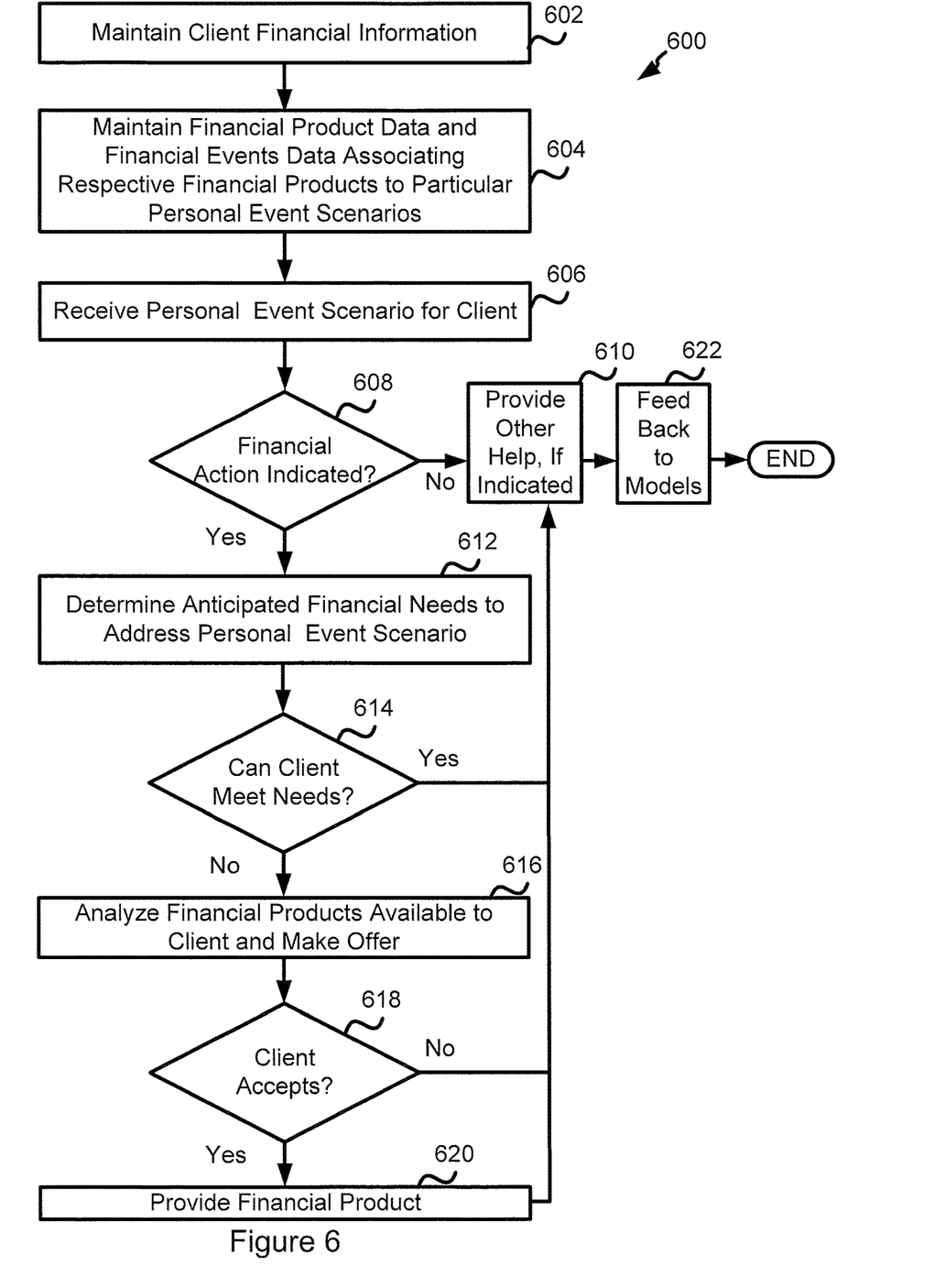
FIG. 6 depicts a flowchart for an exemplary context-based event financial product offering process consistent with the disclosed embodiments.

FIG. 5 depicts a flowchart for an exemplary personal event determination process 500 consistent with the disclosed embodiments. In some aspects, context-based event determination system 152 maintains scenario modeling data related to various personal event scenarios (step 502). As noted in the description with reference to FIG. 1, such operations may include defining and training a machine-learning model and/or other prediction component(s). Feedback to such model may be provided from other processes such as process 600 described below. Feedback may include data confirming or refuting the predicted scenario and may be used to refine and re-train the scenario data model and/or the baseline.

In some aspects, context-based event determination system 152 collects contextual data 160 related to client (e.g. user 110). As noted, contextual data may be received, at various times, by context-based event determination system 152 from client device 102, other client devices (not shown), context-based event detection system 132, and other third party systems and entities as previously described. The contextual data may be stored in database 156. Contextual data may be related in various manners such as by time of occurrence, source (e.g. user, friend or family of user, co-worker, etc.), etc.

In one aspect, contextual data sources may be delineated and analyzed such as in a prioritized sequence. The following describes the delineation of three types of data sources for consideration:

A. Personal sources: the user's social media (e.g. something the user posted);

B. Connected sources: friend's social media about the user (e.g. something a friend notices), and/or social media from other people in proximity (as noted previously)); and C. Global sources: (related to the user) such as public media references to the user.

These sources may be analyzed in a priority sequence (A>B>C) for further confirmation.

In addition to collecting contextual data from other devices or systems, context-based event determination system 152 may generate contextual data (not shown). As previously described, personal event determination system 152 may process contextual data for a user associated with one or more personal spikes and generate candidate personal event scenarios. Such scenarios may be used as contextual data for the user or others (e.g. friends or family) identified by the scenarios. By way of example, assume processing relative to user A identifies a scenario whereby user A is associated to a personal event involving the child of user A (e.g. user A receives news that child of user A is having a baby). Processing personal spike and contextual data associated to the child of user A may output a related personal event scenario (child of user A receives news that child of use A is having the baby). Using the output from the processing of the child of user's A personal spike and contextual data in relation to the processing of the user's respective data may assist to raise the confidence interval associated with the output for the user.

At step 506, personal spike data for a client's personal event is received such as from context-based event detection system 132. At 508 contextual data 160 for client (e.g. user 110) is analyzed such as to generate a data set associated with the personal spike. In some aspects, time windowing and other relations may be used to select among the contextual data available (further discussed below). At step 510, using the scenario data model (prediction component), the personal spike and contextual data is evaluated to determine one or more candidate personal event scenarios. Such scenarios may be associated with a likelihood of accuracy. A confidence interval may be established (step 512). Though steps 510 and 512 are shown as separate steps, such may be combined whereby the confidence interval is established when or as the candidate is determined.

At step 514, the likelihood for each candidate is evaluated. If the likelihood is not sufficient for a respective candidate, processing of the candidate may end via "No" branch from 514. If it is sufficient, processing for the scenario may continue via "Yes" branch. At step 516, one or more candidate scenarios meeting the likelihood determination in step 514 are provided to a financial product offering process such as may be operated by financial offering system 172. Likelihood thresholds may vary by scenario. That is not all scenarios need meet or exceed the same confidence interval threshold. For example, it may be less important to be correct when concluding that one candidate scenario is true versus another. Incorrectly concluding that a user is about to go on a trip is less risky or less important than incorrectly concluding the user has recently lost a job.

Though not shown the output of the candidate and the confidence interval may be stored as contextual information for the client or another friend or family as identified in the scenario.

Time-windowing was previously discussed as a technique for selecting among the contextual data to evaluate various candidate scenarios within the personal data model. In one aspect, personal event scenarios modeled are grouped to classes where each class represents like time windows in the database 156. For example, a car crash may be defined as a class 1 scenario, losing a job as a class 2 scenario and a new pregnancy as a class 3 scenario. The classes are associated to like time windows such as:

Class 1: only examines personal event data, contextual data and client data within a window of x hours about the personal spike;

Class 2: only examines personal event data, contextual data and client data within a window of x days; and Class 3: only examines personal event data, contextual data and client data within a window of x weeks, etc.

Following a receipt of a personal spike, processing to evaluate whether a class 1 scenario occurred may be performed in response to the associated time window. In one aspect, processing may be delayed, for example, following the passage of x hours. If all events and context analyzed in the x hours of the time window do not identify a class 1 scenario, processing may proceed to evaluate for a class 2 scenario or a class 3 scenario, respectively. In one aspect, the receipt of the personal spike triggers the start of collection of the event-related data (e.g. particularly contextual data 160) for the applicable time windows. In another aspect, event-related data may be continuously collected and the applicable time windows used to select from among the collected data. It is understood that some types of event-related data may be continuously collected and others collected in response to the personal spike.

FIG. 6 depicts a flowchart for an exemplary financial offering process 600 consistent with the disclosed embodiments. In some aspects, financial offering system 172 maintains client financial information (step 602). In other aspects, a separate financial system (not shown) maintains such client financial information and provides access thereto to financial offering system 172. At step 604, financial offering system 172 maintains financial product data for respective financial products (which as noted above includes services) available (offerable) to clients In some aspects, financial offering system 172 maintains financial events data associating respective financial products to particular personal event scenarios. In some embodiments, the association between events and financial products may employ a predictive model such as by using the modeling techniques described above. For example, initial training data may define the predictive model and further real world observable data, gathered over time, may be used to refine the scenario data model. The real world and training data may comprise events. Personal event detection system 152 may output personal event scenarios for users as described. Processing such as within financial offering system 172 may observe whether such users spontaneously (i.e. without receiving a personal event triggered offer as described herein) require financial assistance in association with the events and which products are sought by clients experiencing personal scenarios to define the relationships between events and products. Client financial data generated pre- and post-time of occurrence of the personal spike/personal event may be evaluated. Collection of client financial data in association with providing the products may include information to link or associate the client's desire/requirement to the personal event. For example, among others, the client may indicate why the financial product is sought. The client may ask that certain assets be removed from the client financial data, for example such as when a car is destroyed and a new loan is sought. For the description of the remaining steps of process 600 it is assumed that the financial event data and association to financial products is in place to support process 600.

At step 606, a personal event scenario is received for a client (e.g. user 110). More than one event scenario may be received and similarly processed as described. Using the financial event data, a determination is made whether the event scenario indicates financial action is indicated. That is, whether one or more financial products are associated to the personal event scenario. By way of example, a personal event scenario that indicates the client was involved in a car accident in which the client's car was damaged beyond repair may be associated to a car loan financial product. By way of another example, a personal event scenario that indicates the client witnessed a car accident but suffered no injury or damage to the client's vehicle may not be associated to any financial product. One or more than one financial action may be associated with a personal event scenario. Each scenario may be associated with general or specific receptivity indicators. A personal score representing receptivity to financial product offerings for a particular client may be computed and provided, for example, to an advisor. When a client experiences a personal event scenario, receptivity indicators associated with the scenario (e.g. by the financial event data) may then be associated to the client. One or more receptivity indicators associated to a respective client may be combined, such as through averaging or taking the score representing the least receptive or other techniques. Such a score and in addition or in the alternative the fact that the particular client experienced a particular personal event scenario may be available such as when displaying client information and/or client financial data. In one aspect the score and or information about the scenario may be transmitted across a network to another computer system such as one configured for use by financial advisors.

If no financial action is needed, via "No" branch to 610, other help/information may be provided, if indicated. Thereafter, operations end.

Examples of non-financial assistance that may be provided include:

providing individuals involved in a car accident with information on driving lessons (which might be triggered by an age threshold and the absence of having taken lessons, i.e. under 18), or information on alternative routes/options (with less traffic congestion), or information on public transportation which might be triggered by an age threshold (i.e. over 70))

providing individuals planning a wedding with information and contacts for arranging prenuptial agreements (which might be triggered by a specific income or asset threshold), or information about marriage courses (which might be triggered by specific cultural or religious beliefs).

If a financial product is associated such that a financial action offering a new product (or extending terms of existing financial product, etc.) is indicated then via "Yes" branch to step 612, in one aspect, operations determine anticipated financial needs associated with the personal event. Parameters to assist with such determination may be defined in financial events data 178. Determination processing may also review client financial data 180 or other data (not shown) whether stored internally or externally to system 172. For example, insurance data within client financial data 180 of user 110 may indicate that user 110 has no collision coverage on car insurance for the vehicle involved in the accident indicated in the personal event. Client financial data 180 may show historic prices and or vehicles owned by user 110 such that an estimate of a new car purchase price can be determined. The determination processing may identify a class of automobile likely desired by user 110 and search externally (e.g. perform operations that communicate with another computer system) for a range of such pricing. Such pricing may be useful in subsequent processing as described.

At step 614, a determination may be made whether client (e.g. user 110) may meet the financial needs such as without any assistance from an additional financial product. Client financial data may be reviewed and compared to the anticipated financial need determined at step 612. For example, if the client has sufficient liquid assets such as in a bank account or other liquid investments to cover the price of a car, a car loan may not be indicated for the particular user 110. Via "Yes" branch to 610, operations end.

If the client cannot meet such needs, via "No" branch to 616, the financial products can be analyzed to determine availability or suitableness for the client and an offer made, if indicated. Client financial data may be reviewed. For example, if a loan is an indicated financial product, the client's credit rating, etc., may be evaluated to determine an appropriate loan, loan amount, rate or other factor or not to extend a loan. If a client is not credit worthy, other forms of financing such as those not provided by the financial offering entity may be indicated. For example, system 172 may evaluate at connected circles (friend's/family) or other possible sources (government assistance, assistance from the public such as crowd funding, peer-to-peer lending, micro-financing, etc. Process 600 may be configured to offer such other assistance such as at step 610. It is understood that for at least some types of offerings, particularly informational offerings, a "means test" as described with referenced to steps 612, 614 and/616 need not be performed. The offerings may be provided (e.g. operations performed to transmit information etc. to other computer systems, client lists modified, etc.) without determining that a client qualifies. Such qualification may be determined later, for example, if the client replies to the offering.

An offer of a financial product may be extended in accordance with client preference information stored in client financial data 180 and offer related data defined in financial products data 182. For example, an offer or invitation to contact the offering entity may be sent via an electronic message to client device 102 or another device (not shown). A telephone call or other contact (e.g. via mail delivery) may be made. For example, rules and or requirements about how to enroll a user for a particular financial product may be defined in the financial products data 182. Processes may be employed accordingly and may be employed by separate computer systems (not shown).

Offers herein may be an action offer for a particular product including terms or may be informational, describing possible products to the client to prime the client to contact the offering entity or to be receptive to further contact by the offering entity. More than one offer for the same or different products indicated for the personal event may be extended to a client.

The timing of such offering may vary in accordance with the personal event scenario, for example, so that the user is more likely to be receptive to such an offer. As noted, receptivity indicators may be associated to the personal event scenario and/or financial action offerings. These receptivity indicators may be useful to determine when to or when not to communicate offerings. Time-periods after the experiencing of the personal event scenario may be determined from the receptivity indicators.

At step 618, the client accepts and/or replies to the offer or not. If not accepted, processing may follow to step 610 and end, via "No" branch at step 618. If accepted, processing may following to step 620 via "Yes" branch at step 618.

At step 620, the financial product is provided. Routine financial product provision processes may be employed accordingly. Processing may also continue at step 610.

Feedback of information is provided to confirm model data (e.g. at 622) Feedback of information from various processing operations such as at 612, 616 and/or 620 and/or from monitoring activities after such operations (e.g. via survey, etc. (not shown)) may be assistive to confirm model data (e.g. at operations 500) as well as to steps 602 and/604 of operations 600 and/or the personal event baseline. Though shown as an operation prior to the end of operations 600, the feedback may be given at other times and/or following earlier operations. Information related to the offering and/or the provision of the financial product and any related information may be fed back to context-based event detection system 132 and/or to context-based event determination system 152 (feedback not shown). The client may indicate that the personal event did in fact occur or not and/or may advise as to corrective details. For example, such information may validate or not the output and conclusions of such systems and operations described to assist with further respective machine learning within the prediction components as described. The information related to the offering, its acceptance or not and/or related to the providing of the financial product may be useful to define contextual data for the user 110, etc. It may also be useful to refine associations of the financial actions to scenarios and receptivity indicators.

The personal event scenario determined at step 608 may be associated with an action that is not an offering of a new financial product (or the extension of new terms for an existing product, etc.). Thus a financial needs assessment and a user's fit for the new product (e.g. credit worthiness, etc.) may not be required. In one aspect, the action may relate to an existing financial product. For example, the detection of a particular scenario may be associated with an action which freezes (e.g. invokes the placement of a hold upon) certain accounts or products such as for a time-period. In some aspects, the freezing may be subject to an override by the account holder/user. By way of example, the personal event scenario detected may be the user's break up of a relationship. The user may have indicated that break ups lead to regretful spending sprees. The action triggered by the detection of the personal event scenario may be a hold placed on certain accounts, credit cards, etc. such as for a certain time-period.

It is understood that personal event scenarios may be associated with more than one action in relation to one or more financial products. For example, the determination that a user has purchased a new home may include actions in relation to any one or more of a mortgage, mortgage insurance, home insurance, change of address for accounts, etc.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A system, comprising:
    a storage device; and
    at least one processor coupled to the storage device, the storage device storing software instructions for controlling the at least one processor when executed by the at least one processor, the at least one processor being operative with the software instructions and being configured to:
        maintain product and/or service data for respective products and/or services available to clients;
        maintain events data associating respective products and/or services to particular personal event scenarios and actions indicated for particular personal event scenarios;
        receive a personal event scenario experienced by a client;
        determine an offering to provide the client in accordance with:
            the personal event scenario;
            any products and/or services associated with the personal event scenario by the events data; and
            any action that is indicated for the personal event scenario;
        perform operations to communicate to another computer system across a network to provide to the client the offering.

2. The system of claim 1, wherein the at least one processor is further configured to:
    maintain client data for a client; determine anticipated needs to address the personal event scenario; and
    determine, using the client data, whether the client can meet the anticipated needs.

3. The system of claim 2 wherein: a product and/or service comprises a financial product and/or financial service; wherein an action comprises a financial action; wherein client data comprises client financial data; and wherein anticipated needs comprise anticipated financial needs.

4. The system of claim 3, wherein the client financial data for the client comprises at least some of:
    credit rating data;
    income data, whether from employment and/or business sources;
    asset related data comprising bank account, investment, real and personal property data;
    insurance data;
    and loan or other liability related data.

5. The system of claim 1, wherein to provide to the client the offering comprises electronically communicating with a client device across a communications network in accordance with communication channel preference information for the client.

6. The system of claim 1, wherein to maintain the events data comprises:
    training a predictive component of the system to associate the products and/or services to particular personal event scenarios using real-world data examples of personal event scenarios, the real-world data examples compiled by the system by examining client inquiries for particular products and/or services, the examining by the system performed following the receiving of a personal event scenario experienced by the client.

7. The system of claim 1, wherein the financial events data further associates a receptivity indicator with the personal event scenario and the at least one financial product, the receptivity indicator indicating how receptive the client is likely to be to the offering after experiencing the personal event scenario; and
    wherein the at least one processor is further configured to:
        associate the receptivity indicator to the client; and
        provide to the client the offering in response to the receptivity indicator.

8. The system of claim 7, wherein the receptivity indicator is used to determine a time-period within which to or not to communicate the offering to the client after experiencing the personal event scenario.

9. The system of claim 7, wherein the at least one processor is further configured to:
    populate a client list comprising clients to receive a same particular offering; and
    wherein the populating and/or ordering of the client list is responsive to respective receptivity indicators associated with the respective clients.

10. The system of claim 7, wherein the receptivity indicator is responsive to a personal receptivity indicator associated with the client and the at least one product and/or service, the personal receptivity indicator indicating how receptive the client is likely to be to the offering.

11. The system of claim 1, wherein the at least one processor is further configured to perform operations to provide the product and/or service to the client, including updating the client data.

12. The system of claim 1, wherein the at least one processor is further configured to:
    collect information about the client's experiencing of the personal event scenario; and
    communicate such information to a further computer system configured to detect and communicate when clients experience personal event scenarios.

13. The system of claim 1 wherein the at least one processor is further configured to perform operations to communicate with the one or more computer systems over the network to provide feedback in respect of the occurrence of the personal event scenario to maintain or train scenario modeling data which determines the likely occurrence of personal events.

14. A computer-implemented method, comprising:
    maintaining, by at least one processor of a system, product and/or service data for respective products and/or services available to clients;
    maintaining, by the at least one processor, events data associating respective products and/or services to particular personal event scenarios and actions indicated for particular personal event scenarios;

receiving, by the at least one processor, a personal event scenario experienced by a client;

determining, by the at least one processor, an offering of at least one product and/or service to provide the client in accordance with:

the personal event scenario;

any products and/or services associated with the personal event scenario by the financial events data; and any action that is indicated for the personal event scenario;

performing, by the at least one processor, operations to communicate to another computer system across a network to provide to the client the offering.

15. The method of claim 14, comprising:

maintaining, by the at least one processor, client data for a client;

determining, by the at least one processor, anticipated needs to address the personal event scenario; and determining, by the at least one processor, using the client data, whether the client can meet the anticipated needs.

16. The method of claim 15 wherein: a product and/or service comprises a financial product and/or financial service; wherein an action comprises a financial action; wherein client data comprises client financial data; and wherein anticipated needs comprise anticipated financial needs.

17. The method of claim 16, wherein the client financial data for the client comprises at least some of:

credit rating data;

income data, whether from employment and/or business sources;

asset related data comprising bank account, investment, real and personal property data;

insurance data;

and loan or other liability related data.

18. The method of claim 14, wherein to maintain the events data comprises:

training, by the at least one processor, a predictive component of a system to associate the products and/or services to particular personal event scenarios using real-world data examples of personal event scenarios, the real-world data examples compiled by the system by examining client inquiries for particular products and/or services, the examining by the system performed following the receiving of a personal event scenario experienced by the client.

19. The method of claim 14, wherein the events data further associates a receptivity indicator with the personal event scenario and the at least one product and/or service, the receptivity indicator indicating how receptive the client is likely to be to the offering after experiencing the personal event scenario; and wherein the method comprises:

associating, by the at least one processor, the receptivity indicator to the client; and providing to the client the offering in response to the receptivity indicator.

20. The method of claim 19, comprising:

populating, by the at least one processor, a client list comprising clients to receive a same particular offering; and wherein the populating and/or ordering of the client list is responsive to respective receptivity indicators associated with the respective clients.

21. The method of claim 19, wherein the receptivity indicator is responsive to a personal receptivity indicator associated with the client and the at least one product and/or service, the personal receptivity indicator indicating how receptive the client is likely to be to the offering.

22. The method of claim 14 comprising communicating, by the at least one processor, with the one or more computer systems over the network to provide feedback in respect of the occurrence of the personal event scenario to maintain or train scenario modeling data which determines the likely occurrence of personal events.

* * * * *